(12) United States Patent
Park et al.

(10) Patent No.: US 10,001,637 B2
(45) Date of Patent: Jun. 19, 2018

(54) ELECTROWETTING DISPLAY DEVICE AND MANUFACTURING METHOD THEREOF

(71) Applicant: Amazon Technologies, Inc., Seattle, WA (US)

(72) Inventors: Kyung Tea Park, Seoul (KR); Suk-Won Jung, Goyang-si (KR)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 549 days.

(21) Appl. No.: 13/940,678

(22) Filed: Jul. 12, 2013

(65) Prior Publication Data
US 2014/0022622 A1    Jan. 23, 2014

(30) Foreign Application Priority Data

Jul. 12, 2012  (KR) .................... 10-2012-0075997

(51) Int. Cl.
*G02B 26/00*    (2006.01)

(52) U.S. Cl.
CPC ................. *G02B 26/005* (2013.01)

(58) Field of Classification Search
CPC ...... G02B 3/12; G02B 3/14; G02B 2207/115; G02B 26/004; G02B 26/005; G09G 3/348
USPC ......... 252/586; 359/290–293, 295, 315–316, 359/276, 238, 245, 242, 259, 244, 359/253–254, 265–275, 665–667, 226.3, 359/243; 427/58, 66, 77; 430/311, 319, 430/320, 321

See application file for complete search history.

(56) References Cited

U.S. PATENT DOCUMENTS

| | | | |
|---|---|---|---|
| 7,821,699 B1* | 10/2010 | Lo .................... | G02B 26/004 359/244 |
| 2004/0224241 A1* | 11/2004 | Park .................. | G02F 1/136227 430/5 |
| 2009/0191334 A1* | 7/2009 | Dai .................... | G02B 26/005 427/162 |
| 2012/0081777 A1* | 4/2012 | Heikenfeld ......... | G02B 26/005 359/290 |
| 2013/0329274 A1* | 12/2013 | Yang .................. | G02B 26/005 359/290 |

* cited by examiner

*Primary Examiner* — Gary O'Neill
(74) *Attorney, Agent, or Firm* — EIP US LLP

(57) ABSTRACT

An electrowetting display device and manufacturing method thereof. The manufacturing method comprises forming pixel electrodes on a substrate, forming an insulation layer on the pixel electrodes, applying light through a mask to expose portions of the insulation layer, developing the insulation layer to at least partially remove the exposed portions of the insulation layer, wherein the developing forms a water repellent layer on the pixel electrodes and partitioning walls on the water repellent layer, and forming an oil layer between the partitioning walls and on the water repellent layer. The water repellent layer and the sides of the partitioning walls are hydrophobic. Upper surfaces of the partitioning walls are hydrophilic. The partition walls are thicker than the water repellent layer.

17 Claims, 3 Drawing Sheets

[Fig. 1]
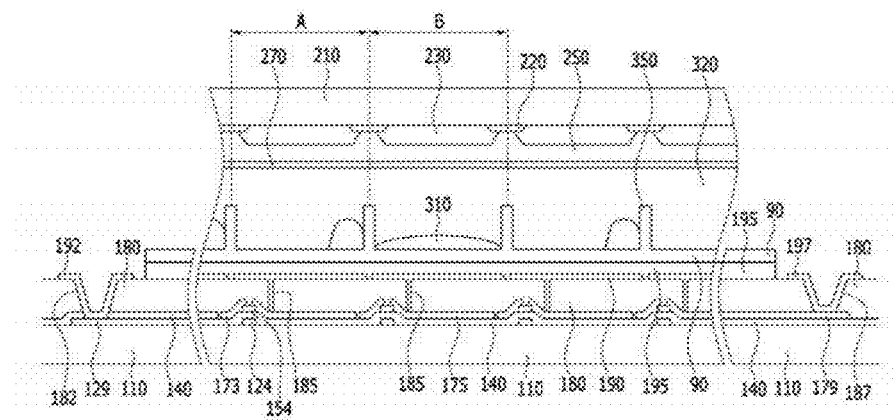
[Fig. 2]
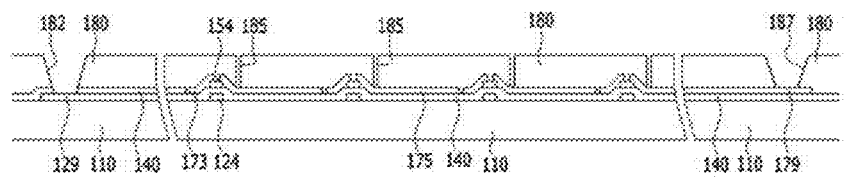
[Fig. 3]
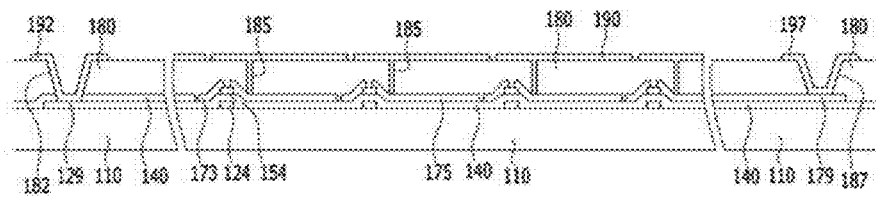
[Fig. 4]
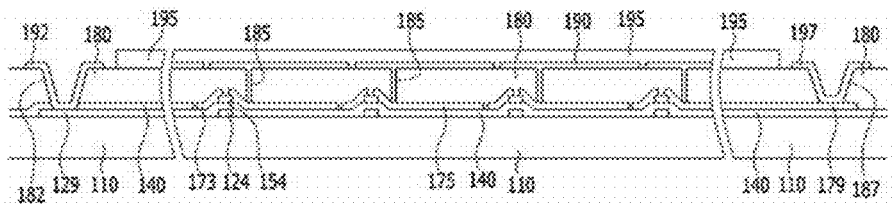

[Fig. 5]
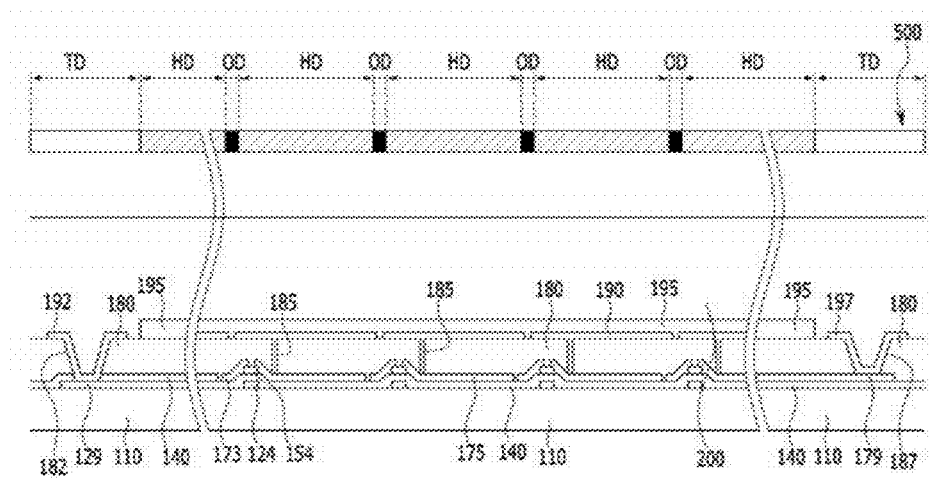
[Fig. 6]
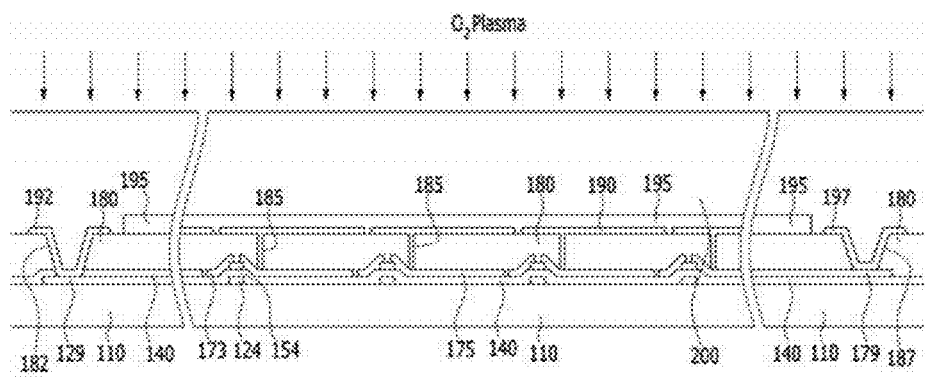

[Fig. 7]
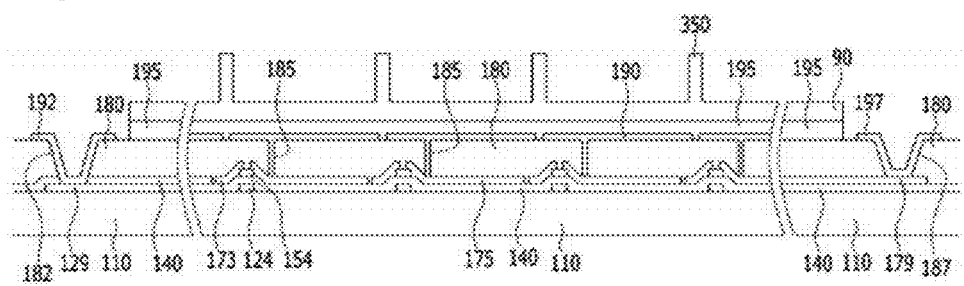
[Fig. 8]
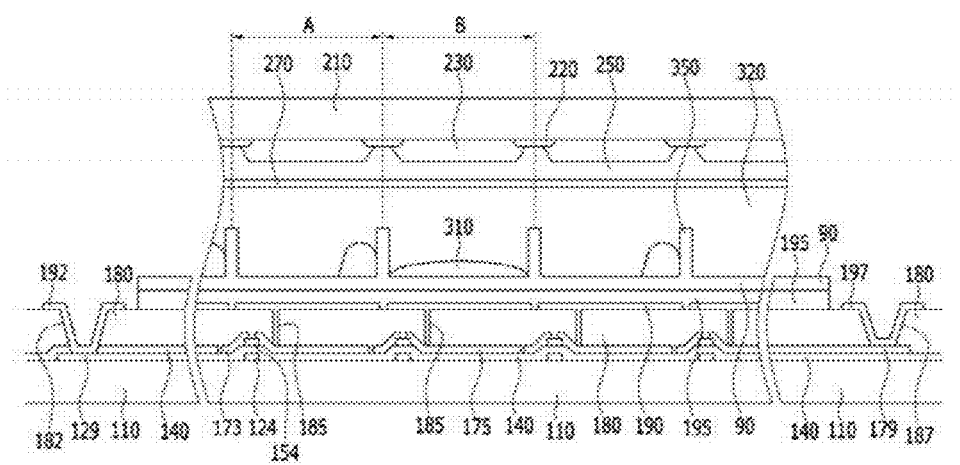

ELECTROWETTING DISPLAY DEVICE AND MANUFACTURING METHOD THEREOF

CROSS REFERENCE TO RELATED PATENT APPLICATIONS

The present application claims priority to Republic of Korea Patent Application No. 10-2012-0075997, entitled "Electrowetting Display Device and Manufacturing Method Thereof", filed Jul. 12, 2012, which is incorporated herein by reference in its entirety.

FIELD OF THE INVENTION

The present disclosure relates an electrowetting display device and manufacturing method thereof and more particularly, an electrowetting display device that can prevent operation failure wherein the manufacturing method thereof provides a simplified process and lower cost.

BACKGROUND

Known types of flat panel displays include liquid crystal displays (LCD), plasma displays (PDP), organic light emitting displays (OLED), field effect displays (FED), eletrophoretic displays (EPD), and electrowetting displays (EWD).

Among these types of displays, the EWD expresses gradation in pixels by controlling movement of oil in water, which is an electrolyte. Since EWDs are shutter type displays that do not use a polarizing plate, an EWD has a high light transmittance and the gamma characteristics (measured by voltage) are linear. In addition, EWDs can be formed as a reflective type display or a transmission type display according to the environment of application. Reflective type displays may omit back light.

While EWDs use the same processes as those used in the processes for other types of flat panel displays such as, for example, LCDs, an additional filling process is required to fill water and oil in the display. Generally, for normal operation of EWDs, a layer below the oil must be a water repellent layer having a hydrophobic property. It is difficult to form a hydrophilic layer, like a partitioning layer, on the water repellent layer. To form a partitioning wall, the water repellent layer must be applied with a reactive ion etching (RIE) treatment. After forming a partitioning wall, oil is provided and then a thermal reflow process is applied so that the water repellent layer resumes hydrophobicity to operate the EWD.

As described above, a plurality of processes have to be conducted alternately to provide hydrophilicity and hydrophobicity, which results in a complicated process, increased time and increased cost. Furthermore, the water repellent layer after the thermal reflow process may fail to acquire sufficient hydrophobicity, which can lead to poor oil filling and deteriorated performance of the EWD.

SUMMARY

A manufacturing method in accordance with an embodiment of the present disclosure comprises forming pixel electrodes on a substrate, forming an insulation layer on the pixel electrodes, applying light through a mask to expose portions of the insulation layer, developing the insulation layer to at least partially remove the exposed portions of the insulation layer, wherein the developing forms a water repellent layer on the pixel electrodes and partitioning walls on the water repellent layer, and forming an oil layer between the partitioning walls and on the water repellent layer. The water repellent layer and the sides of the partitioning walls are hydrophobic. Upper surfaces of the partitioning walls are hydrophilic. The partition walls are thicker than the water repellent layer.

In accordance with an embodiment, the insulation layer may be formed with a material that turns from a hydrophobic to hydrophilic material according to the surface-treating.

In accordance with an embodiment, the surface treatment may be O2 plasma treatment.

In accordance with an embodiment, the insulation layer may be formed with SU-8.

In accordance with an embodiment, the water repellent layer and partitioning walls may be during a single processing step.

In accordance with an embodiment, the mask may be one or more of a half-tone mask or a slit mask.

In accordance with an embodiment, the EWD comprises a display area and a pad area, the display area comprises a plurality of pixel areas, the mask comprises a transparent portion, translucent portion, and shading portion, the transparent portion can correspond to the pad area, the translucent area can correspond to the pixel areas, and the shading portion can correspond to the boundaries of the pixel areas.

In accordance with an embodiment, forming the pixel electrodes comprises further forming auxiliary electrodes on the pad area and the pixel electrodes may be formed on the display area on the substrate.

In accordance with an embodiment, forming the insulation layer further comprises removing the insulation layer placed in the pad area and the auxiliary electrodes may be exposed.

In accordance with an embodiment, the manufacturing method may further comprise forming a protective layer on the pixel electrodes after forming the pixel electrodes.

In accordance with an embodiment, the oil layer may be a black oil layer.

In accordance with an embodiment, the manufacturing method may further comprise forming, before forming the insulation layer, a water repellent layer on the pixel electrodes.

The EWD, in accordance with an embodiment of the present disclosure, comprises pixel electrodes formed on the substrate; a water repellent layer formed on the pixel electrodes; partitioning walls formed on the water repellent layer; and an oil layer interposed between the partitioning walls and placed on the water repellent layer, wherein the water repellent layer and the partitioning walls are made of the same material, the water repellent layer and the lateral sides of the partitioning walls are hydrophobic, the upper sides of the partitioning walls are hydrophilic, and the thickness of the partitioning walls is greater than that of the water repellent layer.

In accordance with an embodiment, the water repellent layer and the partitioning walls may be formed with a material that turns from a hydrophobic to a hydrophilic material according to surface treatment.

In accordance with an embodiment, the surface treatment may be an oxygen plasma treatment.

In accordance with an embodiment, the water repellent layer and the partitioning walls may be formed with SU-8.

In accordance with an embodiment, the water repellent layer and partitioning walls may be formed as an integral body.

In accordance with an embodiment, a protective layer may be further provided before the pixel electrodes and the water repellent layer.

In accordance with an embodiment, the oil layer may be a black oil layer.

BRIEF DESCRIPTION OF THE DRAWINGS

FIG. 1 is a cross-sectional view of an EWD, in accordance with an embodiment of the present disclosure.

FIGS. 2 to 8 are cross-sectional views of the EWD of FIG. 1 representing stages of a manufacturing process, in accordance with an embodiment of the present disclosure.

DETAILED DESCRIPTION

The technical characteristics and other advantages of the invention may be found in the following description of one embodiment, made by way of a non-limiting example and with reference to the accompanying drawings, so that those skilled in the pertinent art will be able to devise an embodiment in accordance with the present disclosure. However, the present disclosure can be implemented in various different ways and is not limited to the embodiments set forth and described herein.

In the drawings, the figures are drawn with enlarged thicknesses in order to express the layers and area more clearly. Throughout the Detailed Description, similar parts and components are depicted with the same numbers. When a layer, film, area or sheet member is said to be "on" another member, such configuration also includes the configurations where other members exist between the two members. On the other hand, an expression "right on something" means that there in no other member between the two.

An embodiment of the display device in accordance with an embodiment of the present disclosure is described hereinbelow with reference to FIG. 1.

FIG. 1 is a cross-sectional view of an EWD in accordance with an embodiment of the present disclosure.

As can be seen in FIG. 1, the EWD, in accordance with an embodiment of the present disclosure, comprises a first substrate 110 formed with pixel electrodes 190, a second substrate 210 opposing the first substrate 110 and formed with common electrodes 270, and electro-optic layers 310 and 320 interposed between the first substrate 110 and second substrate 210.

On the first substrate 110 are formed partitioning walls 350 that define a plurality of openings (space between the partitioning walls). The electro-optic layers 310 and 320 comprise the oil layer 310 and partitioning wall 350 placed inside the opening and the aqueous solution layer 320 positioned between the oil layer 310 and the common electrodes 270.

The first substrate 110 and the second substrate 210 can be a glass substrate, or a flexible substrate made of plastic or glass fiber reinforced plastic (FRP).

On the first substrate 110, a plurality of gate lines extend unidirectionally, gate electrodes 124 are connected to the gate lines and gate extensions 129 are at the end of the gate lines. The gate extensions 129 have extended widths to receive gate signals from a gate driver.

A gate insulation film 140 made of silicon nitride (SiNx), etc. is formed on the gate lines, gate electrodes 124 and gate extensions 129.

A semiconductor layer 154, made of hydrogenated amorphous silicon, etc. is formed on the gate insulation film 140. The semiconductor layer 154, overlaps with the gate electrode 124 and forms a channel of thin film transistors.

On the gate insulation film 140 and semiconductor layer 154, data lines include source electrodes 173 protruding from the data lines, and drain electrodes 175 isolated from the source electrodes 173 are formed. The data lines extend in a direction perpendicular to the gate lines to cross the gate lines, and data extensions 179 whose width is widened to receive data voltage from the data driver are formed at the end of the data lines. At least a portion of a pair of source electrode 173 and drain electrode 175 overlaps on the semiconductor layer 154 and is positioned opposite to the gate electrode 124.

A resistive contact member can be further formed between the semiconductor layer 154, source electrode 173 and drain electrode 175, and the resistive contact member can reduce the contact resistance among these members.

On the source electrodes 173, drain electrodes 175, semiconductor layer 154 and gate insulation layer 140, an inter-layer insulation layer 180 made of an insulation material or an organic material such as silicon oxide or silicon nitride is formed. In the inter-layer firm 180 are formed a contact hole 185 for exposing the drain electrode 175, a contact hole 182 for exposing the gate extension 129, and a contact hole 187 for exposing data extension 179. The contact hole 182 for exposing the gate extension 129 is also formed in the gate insulation layer 140.

On the inter-layer insulation layer 180 are formed pixel electrodes 190, auxiliary electrodes 192 for gate pad, and auxiliary electrode 197 for data pad, which are made of transparent conductive materials, such as ITO (Indium Tin Oxide) or IZO (Indium Zinc Oxide).

The pixel electrode 190 is connected to the drain electrode 175 physically and electrically via the contact hole 185. The auxiliary electrode 192 for gate pad is connected to the gate extension 129 via the contact hole 182 that exposes the gate extension 129. In addition, the auxiliary electrode 197 for data pad is connected to the data extension 179 via the contact hole 187 that exposes the data extension 179.

A protective layer 195 can be formed on the pixel electrode 190, and the protective layer 195 can be made of an organic material. The protective layer 195 is not formed on the auxiliary electrode 192 for gate pad or on the auxiliary electrode 197 for data pad. The protective layer 195 can perform the role of removing the step formed between the adjacent pixel electrodes 190.

A water repellent layer 90 is formed on the protective layer 195 and a plurality of partitioning walls 350 are formed on the water repellent layer 90. The partitioning walls 350 are formed in a matrix having openings and define the pixel areas.

The water repellent layer 90 and the partitioning walls 350 are made of the same material and form an integral body. The water repellent layer 90 and the partitioning walls 350 are made of a hydrophobic, insulation material, and the upper surfaces of the partitioning walls 350 are surface treated to exhibit hydrophilicity. That is, the sides and upper surface of the partitioning wall 350 is hydrophobic and hydrophilic, respectively.

As such, the water repellent layer 90 and the partitioning walls 350 are made of a material whose characteristics can be changed from hydrophobicity to hydrophilicity by surface treatment. For example, the material can be SU-8 or similar. SU-8 is a photo resistive material manufactured by, for example, Micro Chem, exhibiting hydrophobicity that is changed to hydrophilicity by treating the surface with oxygen plasma.

The water repellent layer 90 and the partitioning wall 350 are formed with a step between the two. The partitioning walls 350 are thicker than the water repellent layer 90. The water repellent layer 90 is provided across the entire pixel area, and the partitioning walls 350 are formed along the boundaries of the pixel areas at a level higher than the water repellent layer 90.

The water repellent layer 90 is formed on the protective layer 195 and not on the auxiliary electrode 192 for gate pad or the auxiliary electrode 197 for data pad.

An oil layer 310 is formed in the opening between the partitioning walls 350 and 350. The oil layer 310 is positioned on the water repellent layer 90 and the oil layer 310 can be formed so as that it covers a portion or all of the water repellent layer 90. The area of the oil layer 310 covering the water repellent layer 90 within the pixel area varies by the magnitude of the voltage applied to the pixel electrode 190. The oil layer 310 can be a black oil layer.

A black matrix 220 having a plurality of openings is formed beneath the second substrate 210 and color filters 230 are formed in the openings of the matrix 220.

A flattening layer 250 is formed beneath the color filter 230 and black matrix 220 and a common electrode 270 is formed beneath the flattening layer 250.

In addition, an aqueous solution layer 320 is formed between the partitioning walls 350, oil layer 310 and common electrode 270. The aqueous solution layer 320 is hydrophilic and the oil layer 310 is hydrophobic. Thus, the aqueous solution layer 320 and oil layer 310 do not mix with each other.

Since the surface tension of the aqueous solution layer 320 does not change in the pixel B where no electric field is applied between the pixel electrode 190 and common electrode 270, the oil layer 310 covers the entire area of the pixel B. As such, the light entering from the lower side of the oil layer 310 cannot pass through the layer and the pixel B exhibits black.

In contrast, in the pixel A where an electric field is applied between the pixel electrode 190 and common electrode 270, the surface tension of the aqueous solution 320 changes and opens the pixel A by compressing the oil layer 310. As such, the light entering from the lower side of the oil layer 310 passes through the layer, and the pixel A exhibits a color defined by the color filter 230. The brightness of the pixel A can be controlled by varying the open area of the pixel A according to the magnitude of the electric field formed between the pixel electrode 190 and the common electrode 270.

If necessary, the color filter 230 may be omitted. In accordance with an embodiment of the present disclosure, if the EWD does not include a color filter 230, the pixel exhibits white. The EWD can therefore be used as a black-white display device.

If necessary, a gate drive can be formed at a position above the auxiliary electrode 192 for gate pad. Here the gate drive is formed in the same process that forms the display area, without necessarily forming the gate extension 129 on the gate line but can be connected directly to the gate drive. In this case, the auxiliary electrode 192 for gate pad is not necessary and the contact hole 182 for exposing the gate extension 129 also can be omitted. Since the auxiliary electrode 192 for gate pad also can be omitted, both the auxiliary electrode 192 for gate pad and the auxiliary electrode 197 for data pad may be referred to by auxiliary electrode hereinafter. The auxiliary electrodes for pads, hereinbelow, shall refer to both the auxiliary electrode 192 for gate pad and auxiliary electrode 197 for data pad, or either one when one of the two needs not be formed.

A manufacturing method for the EWD in accordance with an embodiment of the present disclosure is described below by referring to FIG. 2 through FIG. 8.

FIGS. 2 to 8 are cross-sectional views of the EWD during various stages of a manufacturing process, in accordance with an embodiment of the present disclosure.

To begin with, on the first substrate 110, a gate line, gate electrode 124 connected to the gate line, and gate extension 129 at the end of the gate line are formed.

A gate insulation film 140 is formed on the gate line, gate electrode 124 and gate extension 129.

A semiconductor layer 154 is formed on the gate insulation layer 140, overlapping with the gate electrode 124.

On the semiconductor layer 154, a data line, source electrode 173 in connection to the data line, drain electrode 175 isolated from the source electrode 173, and data extension 179 at the end of the data line are formed.

An inter-layer insulation film 180 is formed on the data line, source electrode 173, drain electrode 175 and data extension 179.

In the inter-layer firm 180 are formed a contact hole 185 for exposing the drain electrode 175, a contact hole 182 for exposing the gate extension 129, and a contact hole 187 for exposing data extension 179. The contact hole 182 for exposing the gate extension 129 is also formed in the gate insulation layer 140 in addition to the inter-layer insulation film 180.

Then, as shown in FIG. 3, laminating a transparent conductive material such as ITO (Indium Tin Oxide) or IZO (Indium Zinc Oxide), and forming the pixel electrode 190, auxiliary electrode 192 for gate pad and auxiliary electrode 197 for data pad is done by a patterning process. The pixel electrode 190 is connected to the drain electrode 175 via the contact hole 185 that exposes the drain electrode 175. The auxiliary electrode 192 for gate pad is connected to the gate extension 129 via the contact hole 182 that exposes the gate extension 129, and the auxiliary electrode 197 for data pad is connected to the data extension 179 via the exposure hole 187 that exposes the data extension 179.

Next, as shown in FIG. 4, a protective layer 195 is formed on the pixel electrode 190. The protective layer 195 can be formed by coating the entire surface of the first substrate 110 with an organic material and removing the organic material so that the auxiliary electrode 192 for gate pad and the auxiliary electrode 197 for data pad are exposed. Alternatively, the protection layer 195 can be formed by coating an organic material on the entire area excluding the auxiliary electrode 192 for gate pad and the auxiliary electrode 197 for data pad.

In accordance with an embodiment of the present disclosure, the EWD is defined into a display area for displaying images and a pad area where the pads for receiving external signals are formed. The auxiliary electrode 192 for gate pad and the auxiliary electrode 197 for data pad are formed in the pad area. The protective layer 195 is formed in the display area and not formed in the pad area.

Next, as shown in FIG. 5, an insulation layer 200 is formed on the protective layer 195 by a spin coating method. In some embodiments, a water repellant layer (discussed in detail below) may be formed on the pixel electrodes before the insulation layer is formed. In these embodiments, a strong surface treatment may be used to maintain the hydrophilicity properties described herein.

The insulation layer 200 is made of a material whose characteristics can be changed from hydrophobicity to hydrophilicity by surface treatment. For example, the material can be SU-8 or a similar material. SU-8 is a photo resistive material manufactured by, for example, Micro Chem and exhibiting hydrophobicity, which is changed to hydrophilicity by treating the surface with oxygen plasma.

Next, light is applied through a mask 500 to expose portions of the insulation layer 200 and the insulation layer 200 is exposed by applying light.

The mask 500 can be a half tone mask or slit mask, and comprises transparent (TD), translucent (HD) and opaque (OD) portions. The light entering the mask 500 can pass through the transparent portion (TD) of the mask 500 and cannot pass through the opaque portion (OD). Further, only a portion of the light can pass through the translucent portion (HD) of the mask 500. As a result, the degree of exposure of the insulation layer 200 varies by the positions corresponding to the transparent (TD), translucent (HD), and opaque (OD) portion.

The position of the transparent portion (TD) of mask 500 corresponds to the pad area. The display area of the EWD, in accordance with an embodiment of the present disclosure, covers a plurality of pixel areas. The translucent portion (HD) and the opaque portion (OD) of the mask 500 correspond to a plurality of pixel areas and boundaries of the pixel area, respectively.

The insulation layer 200 that is positioned in the pad area is exposed entirely and the insulation layer 200 that is positioned on the boundaries of the pixel areas is not fully exposed. The insulation layer 200 positioned on the pixel areas is partially exposed. For example, the insulation layer 200 that is positioned on the pixel areas, if the insulation layer 200 is defined into an upper layer and a lower layer that have the same thickness, then the upper layer is exposed and the lower layer is not fully exposed.

Then, as shown in FIG. 6, the upper surface of the insulation layer 200 is surface treated. For example, the upper surface of the insulation layer 200 can be surface treated using oxygen plasma and the hydrophobicity of the upper surface of the insulation layer 200 is changed to hydrophilicity by the surface treatment. After the surface treatment, the insulation layer 200 exhibits hydrophilicity in the exposed areas only and the areas not exposed remain hydrophobic.

Next, as shown in FIG. 7, the insulation layer 200 is developed to at least partially remove the exposed portions of the insulation layer. This developing may form a water repellent layer 90 and partitioning walls 350.

In an embodiment, developing the insulation layer 200 removes the insulation layer 200 in the pad area. Removing the insulation layer 200 results in the exposure of the auxiliary electrode 192 for gate pad and the auxiliary electrode 197 for data pad. Later, the auxiliary electrode 192 for gate and the auxiliary electrode 197 for data pad can be connected to external terminals.

Developing the insulation layer 200 leaves the insulation layer 200 on the boundaries of the pixel area and forms partitioning walls 350. Developing the insulation layer 200 reduces the thickness of the insulation layer 200 in the pixel areas and forms water repellent layer 90. That is, a step is formed between the partitioning wall 350 and the water repellent layer 90, and the partitioning wall 350 is thicker than the water repellent layer 90. Due to the step height difference, a plurality of openings is formed between the partitioning walls 350.

Since the insulation layer 200 is on the boundaries of the pixel areas, the upper surfaces of the partitioning walls 350 exhibit hydrophilicity. Since a portion of the upper part of the insulation layer positioned in the pixel area is removed, the portions having hydrophilicity are all removed, leaving only the portions having hydrophobicity. As a result, the water repellent layer 90 exhibits hydrophobicity. In addition, since a portion of the insulation layer positioned in the pixel area is removed, the sides of the partitioning walls 350 are exposed and the sides of the partitioning walls 350 exhibit hydrophobicity, too.

In the manufacturing method for the EWD, in accordance with an embodiment of the present disclosure, water repellent layers 90 having hydrophobicity and the partitioning walls 350 whose upper faces exhibit hydrophilicity can be formed during a single processing step (and, potentially, simultaneously), by forming an insulation layer, exposing it with a half tone mask or slit mask, applying surface treatment, and developing. That is, complicated processes can be simplified and cost can be saved by forming the water repellent layer 90 and partitioning walls 350 having different characteristics in a single step. Further, since the portion of the insulation layer 200 where water repellent layer 90 will be formed maintains hydrophobicity throughout the process, rejected products can be prevented.

Next, as shown in FIG. 8, black matrix 220, color filter 230, flattening layer 250 and common electrode 270 are formed on the second substrate 210. Join the first substrate 110 and the second substrate 210 so that the common electrode 270 is located on the lower side of the second substrate 210.

An aqueous solution layer 320 is formed between the first substrate 110 and the second substrate 210 so that the aqueous solution layer 320 is interposed between the partitioning walls 350 and oil layer 310 and the common electrode 270. Alternatively, form an aqueous solution layer 320 on the first substrate 110 or on the second substrate 210, and then join the first substrate 110 and the second substrate 210.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A method for manufacturing an electrowetting display device, the method comprising:
   forming pixel electrodes on a substrate;
   forming a photo-resistive insulation layer on the pixel electrodes;
   applying light through a mask to expose portions of the photo-resistive insulation layer;
   applying an oxygen plasma treatment to an upper surface of the photo-resistive insulation layer to cause the upper surface of the photo-resistive insulation layer to become hydrophilic;
   after applying the oxygen plasma treatment, developing the photo-resistive insulation layer to at least partially remove the portions of the photo-resistive insulation layer exposed by the applying light through the mask, wherein the developing forms;
   a first remaining portion of the photo-resistive insulation layer as at least part of a water repellent layer on the pixel electrodes, and
   a second remaining portion of the photo-resistive insulation layer as at least part of partitioning walls on the water repellent layer,
   wherein the water repellent layer and sides of the partitioning walls are hydrophobic, wherein upper surfaces of the partitioning walls are hydrophilic, and wherein the partitioning walls are thicker than the water repellent layer; and forming an oil layer between the partitioning walls and on the water repellent layer.

2. The method of claim 1, wherein, before the applying the oxygen plasma treatment, the photo-resistive insulation layer comprises a material that turns from a hydrophobic material to a hydrophilic material according to the oxygen plasma treatment.

3. The method of claim 2, wherein the photo-resistive insulation layer comprises SU 8.

4. The method of claim 1, wherein the water repellent layer is formed during forming of the partitioning walls.

5. The method of claim 1, wherein the mask is one or more of a half-tone mask or a slit mask.

6. The method of claim 5, wherein:
the electrowetting display device comprises a display area and a pad area, and the display area comprises a plurality of pixel areas;
the mask comprises a transparent portion, a translucent portion, and an opaque portion;
the transparent portion corresponds to the pad area;
the translucent portion corresponds to the pixel areas; and
the opaque portion corresponds to boundaries of the pixel areas.

7. The method of claim 6, wherein forming the pixel electrodes further comprises:
forming auxiliary electrodes for pads in the pad area on the substrate; and
forming the pixel electrodes in the display area on the substrate.

8. The method of claim 7, comprising removing the photo-resistive insulation layer on the pad area to expose the auxiliary electrodes for the pads.

9. The method of claim 1, wherein the forming the pixel electrodes further comprises:
forming a protective layer on the pixel electrodes.

10. The method of claim 1, wherein the oil layer is a black oil layer.

11. An electrowetting display device, comprising:
a substrate;
pixel electrodes on the substrate;
a water repellent layer on the pixel electrodes;
a first partitioning wall having a hydrophobic vertical surface and an oxygen plasma treated top, horizontal portion that is hydrophilic and that has a thickness based on the oxygen plasma treatment, the first partitioning wall on the water repellent layer;
a second partitioning wall that is adjacent to the first partitioning wall; and
an oil layer between the first partitioning wall and the second partitioning wall and on the water repellent layer, wherein:
a photo-resist layer comprises the water repellent layer and the first partitioning wall,
the water repellent layer is hydrophobic, and
the first partitioning wall is thicker than the water repellent layer.

12. The electrowetting display device of claim 11, wherein the water repellent layer and the first partitioning wall comprise a material that has turned from a hydrophobic material to a hydrophilic material according to the oxygen plasma treatment.

13. The electrowetting display device of claim 12, wherein the water repellent layer and first partitioning wall comprise SU-8.

14. The electrowetting display device of claim 11, wherein the water repellent layer and the first partitioning wall are each part of an integral body.

15. The electrowetting display device of claim 11, further comprising a protective layer between the pixel electrodes and the water repellent layer.

16. The electrowetting display device of claim 11, wherein the oil layer is a black oil layer.

17. The electrowetting display device of claim 11, comprising:
a display area comprising the pixel electrodes; and
a pad area comprising auxiliary electrodes for pads.

\* \* \* \* \*

UNITED STATES PATENT AND TRADEMARK OFFICE
CERTIFICATE OF CORRECTION

PATENT NO. : 10,001,637 B2
APPLICATION NO. : 13/940678
DATED : June 19, 2018
INVENTOR(S) : Park et al.

Page 1 of 1

It is certified that error appears in the above-identified patent and that said Letters Patent is hereby corrected as shown below:

In the Claims

In Column 8, Line 59, in Claim 1, delete "forms;" and insert -- forms: --, therefor.

Signed and Sealed this
Sixteenth Day of April, 2019

Andrei Iancu
*Director of the United States Patent and Trademark Office*